United States Patent Office 3,406,015
Patented Oct. 15, 1968

3,406,015
MEANS FOR DETECTING THE FERTILE PERIOD
Raymond O. Foster, Joliet, Ill.
(Hitt and Swanson Sts., Ottawa, Ill. 61350)
No Drawing. Filed Feb. 1, 1965, Ser. No. 429,619
2 Claims. (Cl. 23—230)

ABSTRACT OF THE DISCLOSURE

The invention embraces a test implement and method for using the same for use in detecting the fertile period of the female, which implement is dry, porous paper impregnated with a stable mannitol-peroxide complex and a color forming compound such as guaiac. When the implement is contacted with saliva it undergoes a marked color change in the presence of peroxidase in the saliva, said peroxidase being coincident with the fertile period.

---

This invention relates to a novel analytical test implement useful in detecting the fertile period of the female, and to a novel method for detecting the said fertile period.

There has been much interest in the past in being able to predict and detect the period of time during which the female is fertile, i.e., is capable of conceiving an offspring. The fertile period occurs during ovulation, when the ovum has departed the ovary and is still alive and in a position to be fertilized.

The importance is readily apparent of being able to predict and detect the fertile period, both to those who wish to take advantage of the fertile period and those who wish to avoid it. However, up to the advent of the present invention, the methods and means available for such prediction and detection have been speculative, or distinctly inconvenient. Attempts to calculate said period by reference to the onset of menses are speculative and beset with inaccuracy because the human female, for instance, may ovulate at varying and unpredictable times. On the other hand, mechanical methods such as by taking and recording temperatures, while possibly more accurate, are distinctly inconvenient and may require considerable skill in observing and interpreting the data.

It is an object of the present invention to provide a convenient and reliable method of detecting the fertile period, in a simple test.

A further object is to provide a test implement for detecting the fertile period, said implement being convenient, safe and reliable.

In accordance with the present invention, there is now provided a test implement useful in detecting the fertile period of the female which comprises a bibulous material impregnated with the following as the essential ingredients: (a) a mannitol-peroxide complex and (b) an organic compound which forms a colored oxidation product in the presence of oxygen released from peroxide.

The present invention also provides a novel method for detecting the fertile period of the female which comprises contacting a sample of saliva from a female with the test implement described in the preceding paragraph. The test implement (test paper) will change color during the period of ovulation and fertility of the female while it will undergo no color change at other times.

The great advantage and convenience of this oral test is at once apparent. The female simply touches the test paper to her tongue to wet it, and waits a few minutes to see if a color change develops on the test paper. The result is easily observed, and does not require the recording and interpretation of data over a long period of time. Each test is complete per se. The test is reliable and simple as well as being convenient and relatively inexpensive.

Turning now in more detail to the test implement or test paper, a full description of one preferred embodiment will be given. The test paper is preferably an absorbent paper, for example, an absorbent and chemically pure grade of filter paper or the like. Cloth strips or porous and absorbent wood strips also may be employed. The test paper is impregnated with a solution of the active ingredients and is then subjected to drying to evaporate the solvents and leave the active ingredients on the paper.

In one representative formula 6.9 grams of Methocel, a methyl cellulose product, is dissolved in 440 cc. distilled water, and 100 cc. ethyl alcohol and 250 cc. propyl alcohol are added. Ten grams of mannitol is dissolved in 100 cc. of 3% hydrogen peroxide, mixed for ten minutes and then 500 cc. of acetone is added. A precipitate is formed which is a stable complex of mannitol and hydrogen peroxide. The precipitate is collected by filtration and is washed with 100 cc. acetone. The precipitate is then dissolved in 50 cc. of distilled water and 50 cc. of 3% hydrogen peroxide.

Another solution is prepared which contains 5.0 grams of Tween 80 (a polyoxyethylene derivative of sorbitan) dissolved, along with 2.25 grams of highly purified guaiac, in 100 cc. of ethyl alcohol. Still another solution is prepared by dissolving 10 grams sodium citrate, 2 grams citric acid and 0.125 gram ethylene diamine tetra-acetic acid in 60 cc. distilled water.

The above four solutions are combined, preferably in the order named and large sheets of chemically pure filter paper are impregnated with the mixed solution, and air dried.

The test paper or test tape so prepared was used in clinical studies to determine the accuracy of said test tape in detecting the fertility period as evidenced by changes in the saliva of the female. When compared to the previous standard, namely, the (basal body temperature) thermal shift response, the foregoing test tape gave a correlation above 82%. There is thus provided a convenient and accurate test method and test paper for detecting the fertile period by a simple test on saliva. With the test paper above described the paper turns blue upon contact with saliva when contact is made during a fertile period. Otherwise the tape does not change color upon contact with saliva.

While the foregoing test method and test tape are obviously of primary importance to the human female, it is apparent that the test is applicable to other female animals, and can be of considerable importance.

The response of the test implement may also be demonstrated by contacting another closely related body fluid, namely, cervical mucous with the test implement.

Hydrogen peroxide is known to be unstable under the conditions normally associated with the preparation and use of the test implement described herein. It is therefore unusual to find that the complex of hydrogen peroxide with mannitol is stable and efficacious in this medium. Other stable, orally nontoxic organic complexes of hydrogen perioxide which are capable of releasing oxygen upon contact with peroxidase are likewise useful in the present invention.

While it is preferred to use a highly purified form of guaiac, as described herein, it is also apparent that other organic compounds which will form colored oxidation products in the presence of oxygen released from peroxide may be used. Since this is an oral test, it is, of course, important to use an organic compound or dye which would be essentially nontoxic under the conditions of this test. Benzidine, orthotolidine, dianisidine, phenylene diamine and 2,7-diaminofluorine dihydrochloride are representative examples.

The foregoing invention has been described in detail, but it will be apparent to those skilled in the art that certain substitutions can be made among the ingredients employed herein without, however, departing from the spirit of the invention. All such substitutions are considered to be included herein, provided they fall within the scope of the appended claims.

I claim as my invention:

1. A test implement useful in detecting the fertile period of the female which comprises a bibulous material impregnated with the following as the essential ingredients: (a) a stable mannitol-peroxide complex and (b) an essentially nontoxic organic compound which forms a colored oxidation product in the presence of oxygen released from peroxide.

2. A test implement useful in detecting the fertile period of the female which comprises a bibulous material impregnated with the following as the essential ingredients: (a) a stable mannitol-peroxide complex and (b) guaiac.

References Cited

UNITED STATES PATENTS 3,116,223   12/1963   Rosner et al. _____ 23—230

OTHER REFERENCES

Hunting et al.: "New Method for Peroxidase Determination," Anal. Chem., vol. 31, No. 1, p. 143, January 1959.

Mandel et al.: "Carbohydrates of Human Parotid Saliva," Chem. Abs., vol. 55, p. 17811, September 1961.

Klebanoff et al.: "The Anti-Lactobacillus System of Saliva; Role of Salivary Peroxidase," Chem. Abs., vol. 62, p. 13599, May 1965.

MORRIS O. WOLK, *Primary Examiner.*

L. MEI, *Assistant Examiner.*